(No Model.)
G. W. WEYMAN.
PRESS FOR THE MANUFACTURE OF INSULATORS AND OTHER GLASS ARTICLES.
No. 310,484. Patented Jan. 6, 1885.
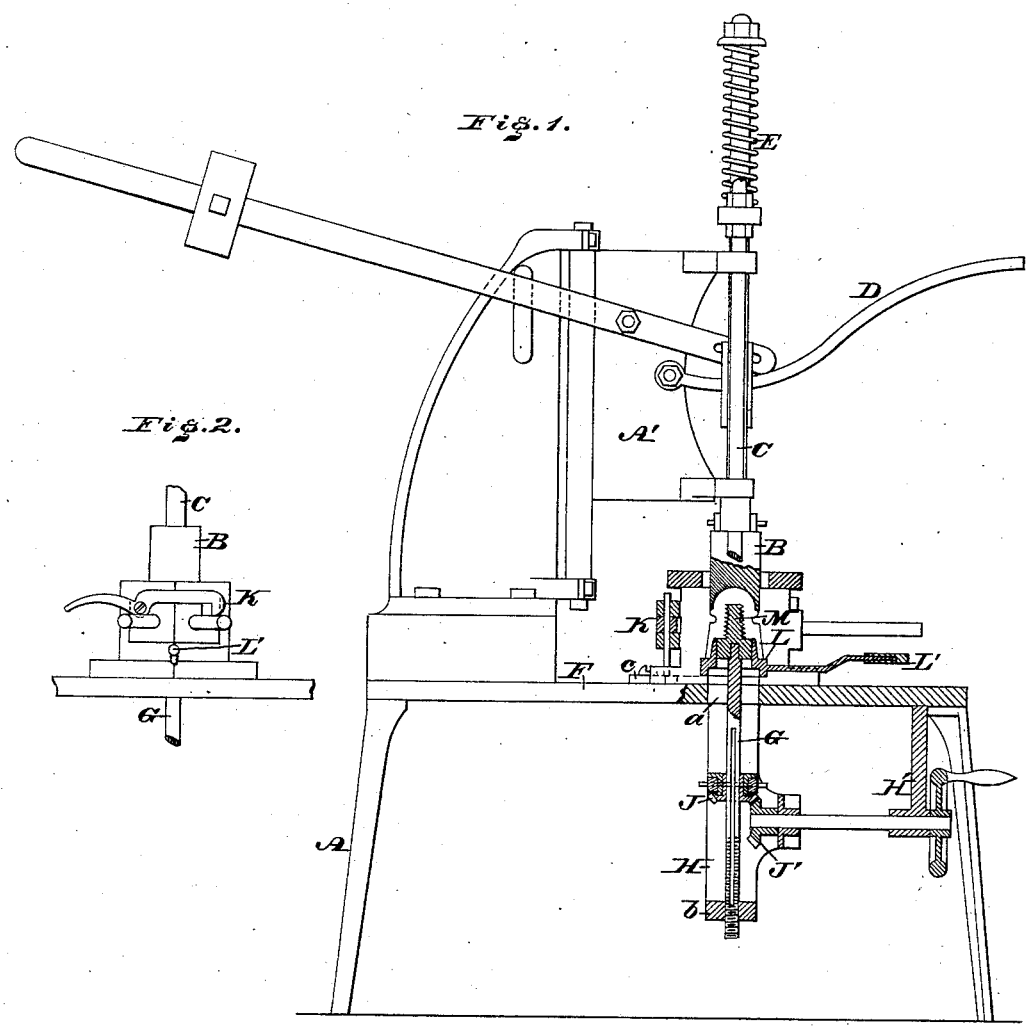
WITNESSES:
INVENTOR:

UNITED STATES PATENT OFFICE.

GEORGE W. WEYMAN, OF PHILADELPHIA, PENNSYLVANIA, ASSIGNOR OF ONE-HALF TO CHARLES T. WEYMAN, OF SAME PLACE.

PRESS FOR THE MANUFACTURE OF INSULATORS AND OTHER GLASS ARTICLES.

SPECIFICATION forming part of Letters Patent No. 310,484, dated January 6, 1885.

Application filed September 25, 1884. (No model.)

*To all whom it may concern:*

Be it known that I, GEORGE W. WEYMAN, a citizen of the United States, residing in the city and county of Philadelphia, State of Pennsylvania, have invented a new and useful Improvement in Presses for the Manufacture of Insulators and other Glass Articles, which improvement is fully set forth in the following specification and accompanying drawings, in which—

Figure 1 represents a side elevation, partly sectional, of an apparatus for manufacturing insulators and other glass articles embodying my invention. Fig. 2 represents a side elevation of detached portion thereof.

Similar letters of reference indicate corresponding parts in the two figures.

My invention consists of a threaded die adapted to be introduced into a mold, whereby the shaped article may be internally threaded, and a holder for supporting the glass while being shaped and removing the shaped article, said holder being of annular form and located within the mold, the opening of the holder permitting the passage of the threaded die in its advancing and returning motions.

Referring to the drawings, A represents the frame of a glass-press, and B the plunger thereof, which latter is connected with the shaft or stem C.

D represents a lever for lowering the plunger, and E represents a spring for returning the same. The shaft C has its bearings on the swinging piece A' of the frame A, whereby the plunger may be moved laterally from the mold.

F represents the table of the frame, the same having an opening, *a*, through which is passed a stem or shaft, G, a portion of which is threaded and engages with the threaded crosspiece *b* of a hanger, H, the latter depending from the table F.

Encircling the shaft G is a bevel-wheel, J, which is connected with said shaft by a feather, whereby said shaft may rotate and rise and fall, said wheel being mounted on the hanger H.

Geared with the wheel J is a gear-wheel, J', to which power is communicated by a crank wheel or handle—but other means may be employed—the shaft of said wheel being mounted on the frame of the machine or the hangers H H', as shown.

Supported on the table F is the mold K, which is formed of sections which may be opened, and has its face of the form of the sides of an insulator, it being noticed that the working face of the plunger is of the form of the top of an insulator. Within the mold is a holder, L, which rests in a recess therein, and has a handle, L', the shank of which rests in grooves in the sections of the mold, the grasping portion of the handle being outside of the mold, said holder being of the form of the base of an insulator and portion of the interior thereof.

To the upper end of the shaft G is secured a screw-shaped die, M, the same being adapted to form the thread or the interior of an insulator, and it passes through the holder L, which, as will be seen, is of annular form.

The operation is as follows: When the die M is elevated and the mold closed, the plunger being moved from the top of the latter, the glass placed in the mold envelops part of the side of the holder L and the threads of the die M. The plunger is then returned over the mold and lowered, so that the glass is properly pressed and receives the shape of the insulator, with a thread on the interior thereof, as above referred to. The shaft of the gearing is then rotated, so that the die M descends and leaves the shaped glass, and the plunger is permitted or caused to rise. The mold is now opened and the holder withdrawn, thus removing the insulator which rested on the holder within the mold. The holder is then restored to its operative position, the mold closed, and the die elevated, and the operations of forming another insulator may be repeated. As the mold rests loosely on the table, it will rise during the unscrewing operation of the die M, due to differences in the pitch of the thread of said die and that of the shaft G.

The table is provided with suitable gages, *c*, for uniformly locating the mold thereon.

As the holder L is of annular form, as described, it permits the screw-die to pass through the same in its advancing and returning motions. Again, the upper portion of the holder is of less external diameter than the lower face of the plunger, and thus the holder acts in connection with the screw-die to shape the insulator or article pressed.

Having thus described my invention, what I claim as new, and desire to secure by Letters Patent, is—

1. In a glass-press, a mold, a plunger, and a rising and falling shaft having a die, in combination with a holder of the form of an annulus, removably fitted within the mold, substantially as and for the purpose set forth.

2. In a glass-press, a mold, a plunger, and a rising and falling shaft having a screw-shaped die, in combination with a holder of the form of an annulus, fitted within the mold and provided with a handle, whereby the article, when formed, may be removed from the mold by said holder, substantially as and for the purpose set forth.

3. In a glass-press, a rising and falling shaft carrying a screw-die on one end, in combination with a plunger and a detachable holder, said holder being annular in form, and having an upper portion of less external diameter than the lower face of the plunger, whereby said holder acts in connection with the said die in shaping the article pressed, substantially as and for the purpose set forth.

4. A screw-shaped die and means for rotating and raising and lowering the same, a mold, a detachable holder within the mold, and a plunger, combined and operating substantially as and for the purpose set forth.

GEORGE W. WEYMAN.

Witnesses:
JOHN A. WIEDERSHEIM,
JNO. K. PLITT.